United States Patent
Malaspina et al.

(10) Patent No.: US 10,845,787 B1
(45) Date of Patent: Nov. 24, 2020

(54) CONCURRENT UPDATING FOR LINEAR TOPOLOGIES IN AN INDUSTRIAL AUTOMATION ENVIRONMENT

(71) Applicant: Rockwell Automation Technologies, Inc., Mayfield Heights, OH (US)

(72) Inventors: Fabio Malaspina, Cleveland, OH (US); James A. Bizily, Cleveland, OH (US); Elvis Chunhui Zhu, Liaoning (CN); Fiona Yuan Wei, Liaoning (CN); Jeff Jingfeng Chen, Liaoning (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/514,500

(22) Filed: Jul. 17, 2019

(51) Int. Cl.
*G06F 8/65* (2018.01)
*G05B 19/418* (2006.01)
*G06F 9/4401* (2018.01)

(52) U.S. Cl.
CPC .......... *G05B 19/4185* (2013.01); *G06F 8/65* (2013.01); *G06F 9/4401* (2013.01)

(58) Field of Classification Search
None
See application file for complete search history.

(56) References Cited

U.S. PATENT DOCUMENTS

| | | | |
|---|---|---|---|
| 2013/0145141 A1* | 6/2013 | Han | G06F 8/65 713/2 |
| 2017/0286099 A1* | 10/2017 | Wilkinson | G06F 8/71 |
| 2018/0150289 A1* | 5/2018 | Adrangi | G06F 8/65 |
| 2018/0359144 A1* | 12/2018 | Malaspina | G06F 8/65 |
| 2018/0365423 A1* | 12/2018 | Poppe | G06F 21/105 |
| 2019/0155594 A1* | 5/2019 | Nakaguma | G06F 13/00 |
| 2019/0235855 A1* | 8/2019 | Nakano | G06F 13/4204 |

* cited by examiner

*Primary Examiner* — Philip Wang (57) ABSTRACT

An industrial controller within an industrial automation environment is provided. The industrial controller includes a plurality of control devices, and an update controller which is configured to identify control devices that are on a linear topology, identify control devices on the linear topology that require a reset after updating, and identify a hierarchy of the control devices. The update controller is also configured to update control devices within a first level of the hierarchy, and reset the control devices within the first level of the hierarchy after all of the control devices within the first level of the hierarchy have completed updating. The update controller is further configured to concurrently update control devices within a second level of the hierarchy, and concurrently reset the control devices within the second level of the hierarchy after all of the control devices within the second level of the hierarchy have completed updating.

20 Claims, 5 Drawing Sheets

CONCURRENT UPDATING FOR LINEAR TOPOLOGIES IN AN INDUSTRIAL AUTOMATION ENVIRONMENT

TECHNICAL BACKGROUND

Industrial automation environments are often very complex and include large numbers of various industrial control devices. In a broad sense, these control devices may have a hierarchical structure having various layers of control down to the individual programmable control devices which each control an industrial machine.

The control devices typically include a memory for storing configuration data along with operating instructions and commands for the industrial machine or lower level devices they control. The memory also includes firmware for operating the control device. At various times throughout a typical lifecycle, some or all of the data stored in the memory of the control device will need to be updated. Many control devices need to be reset after an update. This reset causes downstream communications to be interrupted.

Overview

In an embodiment, an industrial controller within an industrial automation environment is provided. The industrial controller includes a plurality of control devices, and an update controller which is configured to identify control devices of the plurality of control devices that are on a linear topology, identify control devices on the linear topology that require a reset after updating, and identify a hierarchy of the control devices that are on a linear topology and require a reset after updating.

The update controller is also configured to update control devices within a first level of the hierarchy, and reset the control devices within the first level of the hierarchy after all of the control devices within the first level of the hierarchy have completed updating. The update controller is further configured to concurrently update control devices within a second level of the hierarchy, and concurrently reset the control devices within the second level of the hierarchy after all of the control devices within the second level of the hierarchy have completed updating.

In another embodiment, a method for updating a plurality of control devices within an industrial automation environment is provided. The method includes identifying control devices of the plurality of control devices that are on a linear topology, identifying control devices on the linear topology that require a reset after updating, and identifying a hierarchy of the control devices that are on a linear topology and require a reset after updating.

The method also includes updating control devices within a first level of the hierarchy, and resetting the control devices within the first level of the hierarchy after all of the control devices within the first level of the hierarchy have completed updating. The method further includes concurrently updating control devices within a second level of the hierarchy, and concurrently resetting the control devices within the second level of the hierarchy after all of the control devices within the second level of the hierarchy have completed updating.

In a further embodiment, one or more non-transitory computer-readable media having stored thereon program instructions to update a plurality of control devices within an industrial automation environment. The program instructions, when executed by a computing system, direct the computing system to at least identify control devices of the plurality of control devices that are on a linear topology, identify control devices on the linear topology that require a reset after updating, and to identify a hierarchy of the control devices that are on a linear topology and require a reset after updating.

The program instructions also direct the computing system to update control devices within a first level of the hierarchy, and to reset the control devices within the first level of the hierarchy after all of the control devices within the first level of the hierarchy have completed updating. The program instructions further direct the computing system to concurrently update control devices within a second level of the hierarchy, and to concurrently reset the control devices within the second level of the hierarchy after all of the control devices within the second level of the hierarchy have completed updating.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
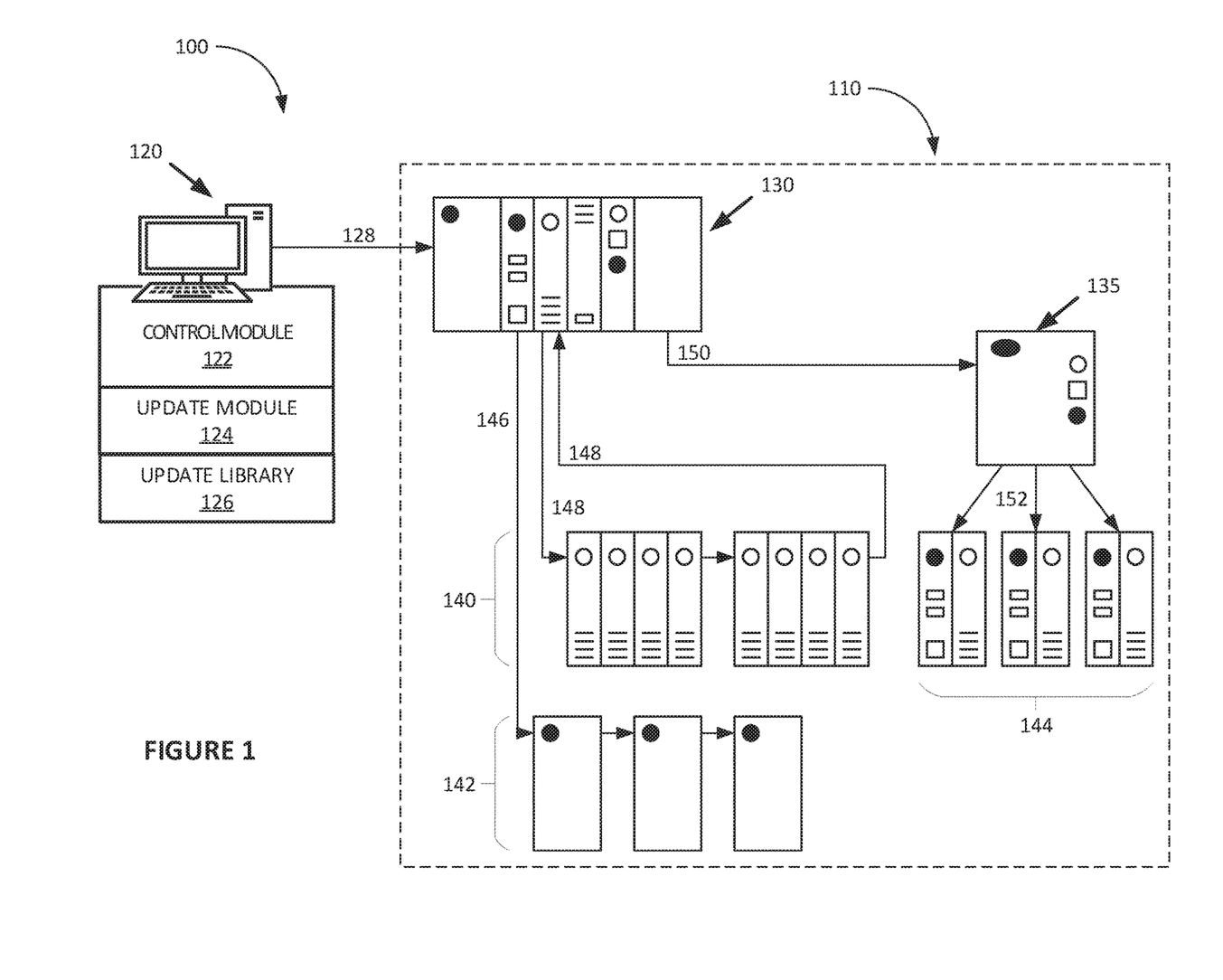
FIG. 1 illustrates an exemplary industrial automation system.

FIG. 1 illustrates an exemplary industrial automation system 100. This example includes update controller 120 for updating various industrial control devices within industrial automation environment 110. Industrial automation environment 110 includes a plurality of various control devices such as control devices 130 and 135 which each control further industrial control devices in a hierarchical topology.

In this example control device 130 controls three devices 142 which are on a linear topology through link 146. Control device 130 also controls eight devices 140 which are on a Device Level Ring (DLR) topology through link 148. Control device 130 also controls device 135 through link 150, which in turn controls three devices 144 which are on a star topology through links 152.

These links may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

Periodically, some or all of these control devices may require updates from update controller 120. In this example, update controller 120 communicates with industrial automation environment 110 over link 128 which may be an EtherNet or Internet Protocol (IP) link, or the like. Update controller 120 includes control module 122 which includes programming instructions directing update controller 120 on how to control the devices within industrial automation environment 110.

Update controller 120 also includes update module 124 which includes programming instructions directing update controller 120 on how to update each of the various control devices 130, 135, 140, 142, and 144 within industrial automation environment 110. Update controller 120 further includes update library 126 which may include firmware updates, configuration data, and the like for each of the various control devices 130, 135, 140, 142, and 144 within industrial automation environment 110.

Figure 2:
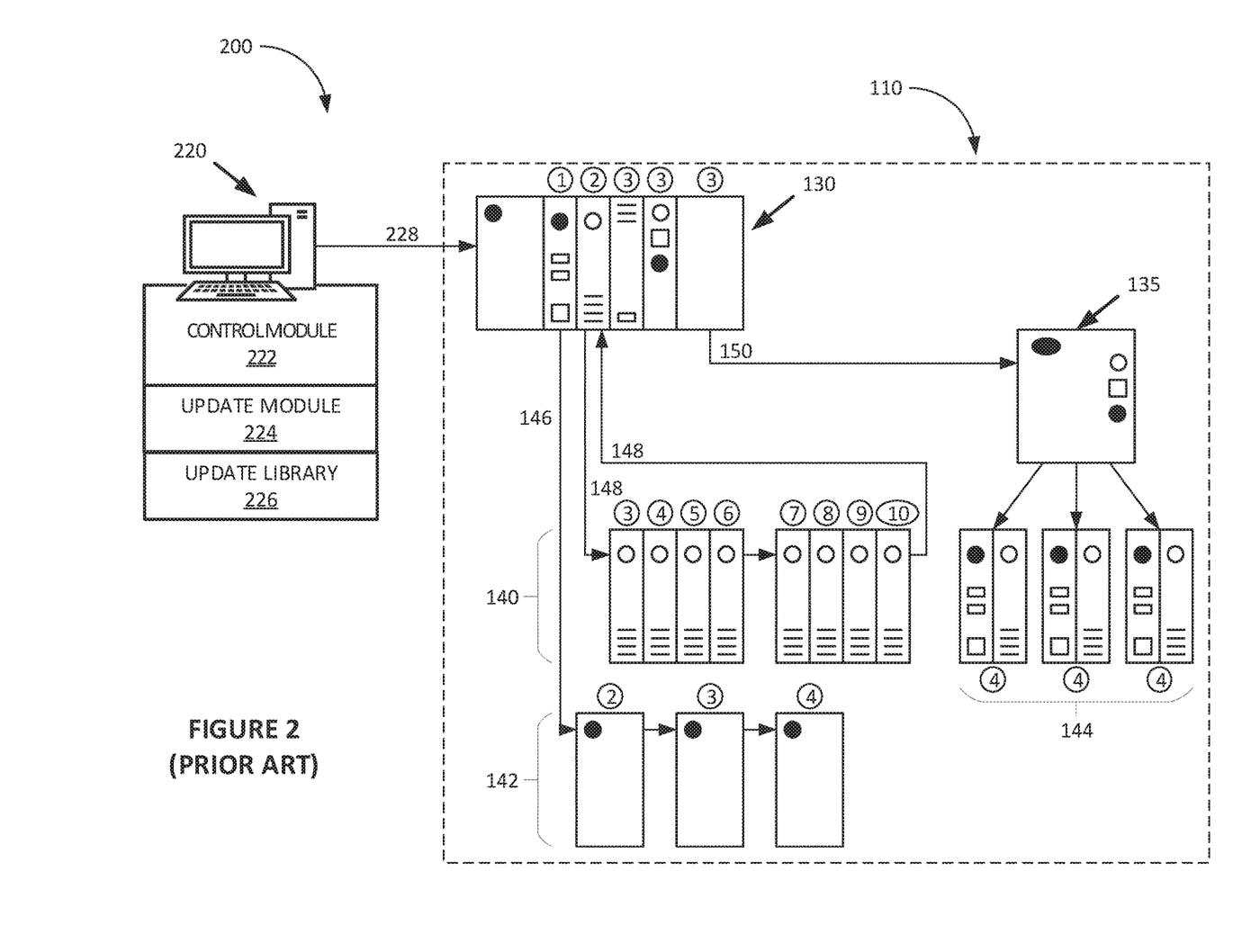
FIG. 2 illustrates an exemplary prior art industrial automation system.
Figure 3:
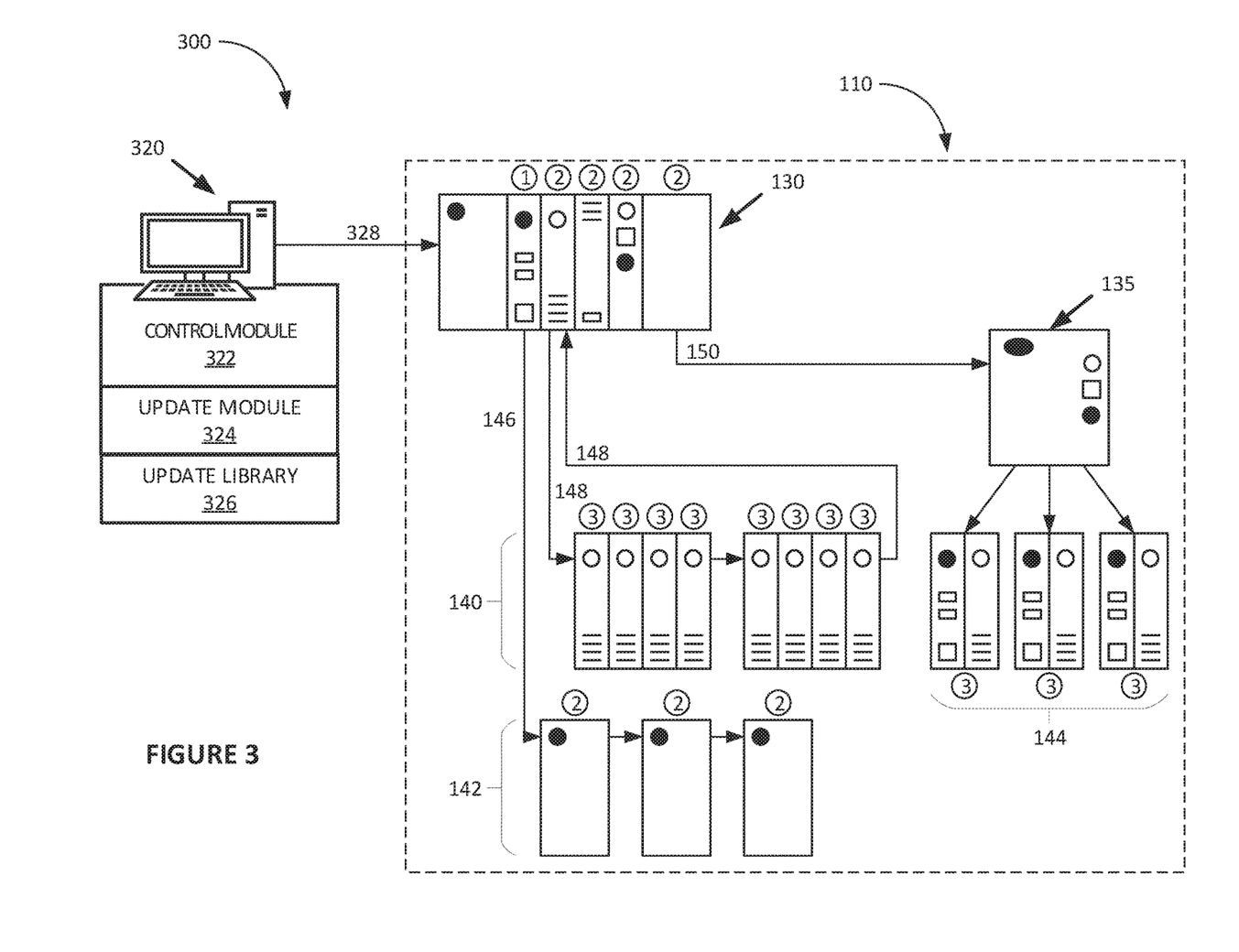
FIG. 3 illustrates an exemplary industrial automation system providing for concurrent updates of industrial control devices.

After receiving an update these control devices may reset which disrupts downstream communication. FIG. 2 illustrates a prior art method of updating these control devices, while FIG. 3 illustrates an improved method providing for concurrent updates of control devices having a linear topology.

FIG. 2 illustrates an exemplary prior art method for updating control devices within an industrial automation system 200. In this example embodiment, update controller 220 is configured to update the various control devices in industrial automation environment 110 from FIG. 1 according to an exemplary prior art method.

In this example, update controller 220 communicates with industrial automation environment 110 over link 228 which may be an EtherNet or Internet Protocol (IP) link, or the like. Update controller 220 includes control module 222 which includes programming instructions directing update controller 220 on how to control the devices within industrial automation environment 110.

Update controller 220 also includes update module 224 which includes programming instructions directing update controller 220 on how to update each of the various control devices 130, 135, 140, 142, and 144 within industrial automation environment 110. Update controller 220 further includes update library 226 which may include firmware updates, configuration data, and the like for each of the various control devices 130, 135, 140, 142, and 144 within industrial automation environment 110.

In this example, steps in the update process are illustrated in FIG. 2 by their sequential step number within a circle. Step 1 is followed by step 2, and so on through step 10. Devices labeled for step 1 are updated and reset, then devices labeled for step 2 are updated and resent, and so on through devices labeled for step 10.

In this example prior art embodiment, update controller 220 sends updates to the various control devices within industrial automation environment 110 in a hierarchical order. Of the five devices that need updating in control device 130, the first (second from the left) device is updated during step 1, the second device (third from the left) device is updated during step 2, while the three remaining devices (on the right) are updated during step 3.

The three devices 142 having a linear topology are updated during steps 2, 3, and 4. The three devices 144 having a star topology are all updated during step 4. The eight devices 140 on the Device Level Ring (DLR) are updated during steps 3 through 10. Thus, it takes a total of ten update steps to update all the devices illustrated within industrial automation environment 110. The only devices able to be concurrently updated are devices 144 having a star topology.

FIG. 3 illustrates an exemplary method for concurrently updating control devices within an industrial automation system 300. In this example embodiment, update controller 320 is configured to concurrently update the various control devices in industrial automation environment 110 from FIG. 1, providing for a shorter update time than the prior art method illustrated in FIG. 2.

In this example, update controller 320 communicates with industrial automation environment 110 over link 328 which may be an EtherNet or Internet Protocol (IP) link, or the like. Update controller 320 includes control module 322 which includes programming instructions directing update controller 320 on how to control the devices within industrial automation environment 110.

Update controller 320 also includes update module 324 which includes programming instructions directing update controller 320 on how to update each of the various control devices 130, 135, 140, 142, and 144 within industrial automation environment 110. Update controller 320 further includes update library 326 which may include firmware updates, configuration data, and the like for each of the various control devices 130, 135, 140, 142, and 144 within industrial automation environment 110.

In this example, steps in the update process are illustrated in FIG. 3 by their sequential step number within a circle. Step 1 is followed by step 2, which is followed by step 3. Devices labeled for step 1 are concurrently updated and concurrently reset, then devices labeled for step 2 are concurrently updated and concurrently resent, finally devices labeled for step 3 are concurrently updated and concurrently reset.

By concurrently updating devices having a linear topology, this method greatly improves the time required to update all the devices in industrial automation environment 110. Since most devices require a reset after updating, which disrupts downstream communication, update controller 320 requires the devices updating during a step to wait until all of the devices in that step (level of the hierarchy) have completed updating before sending commands to concurrently reset all of the devices in that step (level of the hierarchy).

This allows the devices to reset at the same time and minimized the disruption of downstream communication. In some examples, update controller 320 will display or otherwise provide a message to users noting that it is waiting for all devices in the step (level of the hierarchy) to complete their updates before it issues the concurrent reset command(s). In this example embodiment, update controller 320 determines which devices need to be reset after updating by reading a flag or register within each device.

In this example embodiment, update controller 320 sends updates to the various control devices within industrial automation environment 110 in a hierarchical order. Of the five devices that need updating in control device 130, the first (second from the left) device is updated during step 1, while the four remaining devices (on the right) are updated during step 2.

The three devices 142 having a linear topology are updated during step 2. The three devices 144 having a star topology are all updated during step 3. The eight devices 140 on the Device Level Ring (DLR) are updated during step 3. Thus, it takes a total of three update steps to update all the devices illustrated within industrial automation environment 110, which is a substantial improvement over the method illustrated in FIG. 2. In this example, all of the devices having a linear topography, star topography, and Device Level Ring (DLR) topology are able to be concurrently updated, and then concurrently reset, resulting in a much more efficient updating process.

Figure 4:
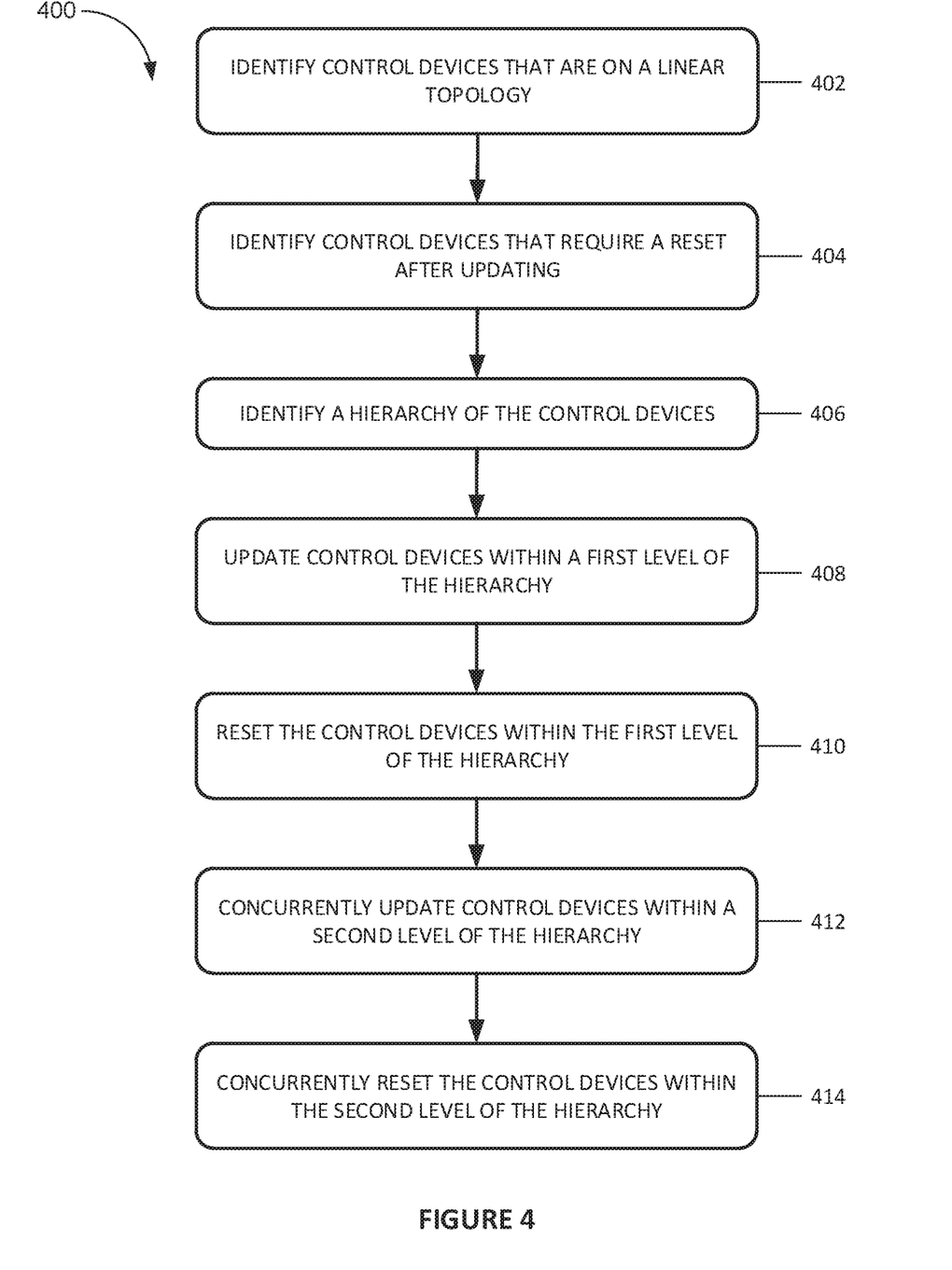
FIG. 4 illustrates a flow chart of an exemplary method for updating a plurality of control devices within an industrial automation environment.

FIG. 4 illustrates a flow chart 400 of an exemplary method for updating a plurality of control devices 130, 135, 140, 142, 144 within an industrial automation environment 110. In this example embodiment, update controller 130 identifies control devices 130, 135, 140, 142, 144 within industrial automation environment 110 that are on a linear topology, (operation 402).

Update controller 320 also identifies control devices 130, 135, 140, 142, 144 within industrial automation environment 110 that require a reset after updating, (operation 404). Update controller 320 further identifies a hierarchy of the control devices 130, 135, 140, 142, 144 within industrial automation environment 110, (operation 406).

Update controller 320 updates control devices 130, 135, 140, 142, 144 within industrial automation environment 110 that are on a first level of the hierarchy, (operation 408). After all of the control devices 130, 135, 140, 142, 144 that are on the first level of the hierarchy have completed their updates, update controller 320 resets control devices 130, 135, 140, 142, 144 within industrial automation environment 110 that are on the first level of the hierarchy, (operation 410).

Update controller 320 concurrently updates control devices 130, 135, 140, 142, 144 within industrial automation environment 110 that are on a second level of the hierarchy, (operation 412). After all of the control devices 130, 135, 140, 142, 144 that are on the second level of the hierarchy have completed their updates, update controller 320 concurrently resets control devices 130, 135, 140, 142, 144 within industrial automation environment 110 that are on the second level of the hierarchy, (operation 414). Operations 412 and 414 are then applied to each remaining level of the hierarchy.

Figure 5:
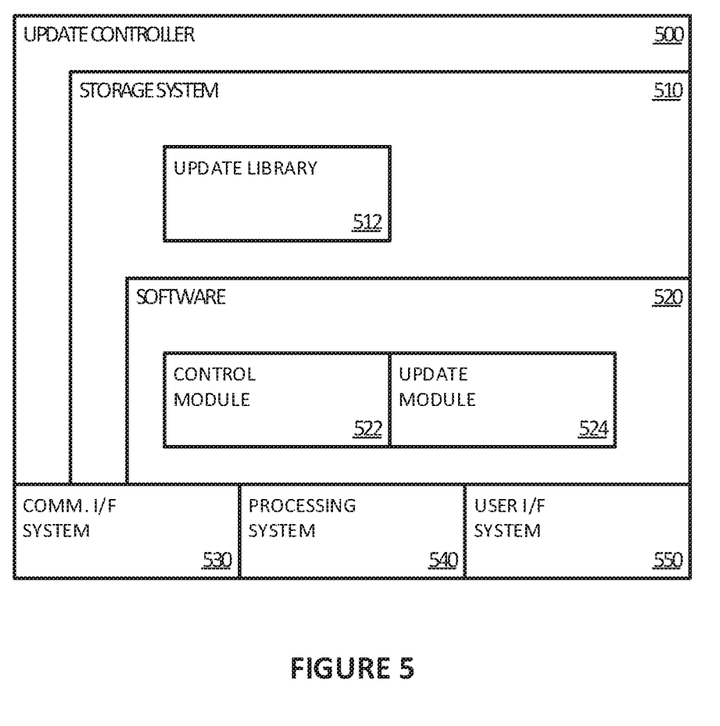
FIG. 5 illustrates an exemplary update controller within an industrial automation system.

FIG. 5 illustrates an exemplary update controller 500, such as update controller 320 from FIG. 3, within an industrial automation system, such as industrial automation system 300 from FIG. 3.

Update controller 500 includes user interface system 550, communication interface system 530, processing system 540, and storage system 510. Storage system 510 in the example shown includes software 520. In some examples, software 520 comprises control module 522 and update module 524, that configure the update controller 500, when executed by the update controller 500 in general or processing system 540 in particular, to direct update controller 500 to perform industrial automation operations, such as updating a plurality of control devices within an industrial automation environment as illustrated in FIG. 4. Other data, such as update library 512, is also stored in storage system 510. In an example embodiment, update library 512 includes firmware updates for industrial control devices.

Processing system 540 may comprise a microprocessor and other circuitry that retrieves and executes software 520 from storage system 510. Processing system 540 may be implemented within a single processing device, but may also be distributed across multiple processing devices or subsystems that cooperate in executing program instructions. Examples of processing system 540 include general purpose central processing units, application specific processors, and logic devices, as well as any other type of processing device, combinations, or variations.

Storage system 510 may comprise any computer readable storage media readable by processing system 540 and capable of storing software 520. Storage system 510 may include volatile and nonvolatile, removable and non-removable media implemented in any method or technology for storage of information, such as computer readable instructions, data structures, program modules, or other data. Storage system 510 may be independent from or integrated into processing system 540. Storage system 510 can comprise additional elements, such as a memory controller, capable of communicating with processing system 540. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 510 may also include communication media over which software 520 may be communicated internally or externally. Storage system 510 may be implemented as a single storage device but may also be implemented across multiple storage devices or sub-systems co-located or distributed relative to each other. Storage system 510 may comprise additional elements capable of communicating with processing system 540 or possibly other systems.

Software 520 may be implemented in program instructions and among other functions and may, when executed by processing system 540, direct processing system 540 to operate as described herein. In particular, the program instructions may include various components or modules that cooperate or otherwise interact to implement at least a portion of server or update controller 500. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 520 in the examples comprises computer programs, firmware, or some other form of machine-readable processing instructions. Software 520 may include an operating system, utilities, drivers, network interfaces, applications, virtual machines, or some other type of software. Software 520 may include additional processes, programs, or components, such as operating system software or other application software. Software 520 may also comprise firmware or some other form of machine-readable processing instructions executable by processing system 540.

In general, software 520, when loaded into processing system 540 and executed, may transform a suitable apparatus, system, or device from a general-purpose computing system into a special-purpose computing system customized to assist in updating a plurality of control devices within an industrial automation environment, among other operations. Indeed, encoding software 520 on storage system 510 may transform the physical structure of storage system 510. The specific transformation of the physical structure may depend on various factors in different implementations of this description. Examples of such factors may include, but are not limited to the technology used to implement the storage media of storage system 510 and whether the computer-storage media are characterized as primary or secondary storage, as well as other factors.

User interface system 550 may include communication connections and devices that allow for communication with users over a communication network or collection of networks. User interface system 550 may include user input and output devices for being controlled by a user, or these devices may be external to server or update controller 500.

User interface system 550 may comprise a network card, network interface, port, or interface circuitry that allows update controller 500 to communicate over a network or networks. User interface system 550 may also include a memory device, software, processing circuitry, or some other device. User interface system 550 can use any suitable communication protocol to exchange communications with a user.

User interface system 550 may include components that communicate over communication links, such as network cards, ports, RF transceivers, processing circuitry and software, or other communication components. User interface system 550 may be configured to communicate over electrically conductive, wireless, optical, or other links.

User interface system 550 can further include components that interact with a user to receive user inputs and user communications and to present media and/or information. These components typically include a keyboard, display, indicator lights, speakers, touch pads, microphone, buttons, mouse, or other user input/output apparatus, including combinations thereof.

Communication interface system 530 may include communication connections and devices that allow for communication with computers, such as industrial controller 130, over a backplane, a communication network, or a collection of networks.

Communication interface system 530 may comprise a network card, network interface, port, or interface circuitry that allows update controller 500 to communicate over a network or networks. Communication interface system 530 may also include a memory device, software, processing circuitry, or some other device. Communication interface system 530 can use any suitable communication protocol to exchange communications with another computer.

Communication interface system 530 may include components that communicate over communication links, such as network cards, ports, RF transceivers, processing circuitry and software, or other communication components. Communication interface system 530 may be configured to communicate over electrically conductive, wireless, optical, or other links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. An industrial controller within an industrial automation environment, the industrial controller comprising:
   a plurality of control devices; and
   an update controller comprising a processor, coupled with the plurality of control devices, configured to:
      identify sequential steps in an update process for each control device of the plurality of control devices that is configured in a linear topology and requires a reset after updating, wherein control devices within each step are updated and reset before control devices within subsequent steps are updated;
      concurrently update control devices within a first step;
      concurrently reset the control devices within the first step after all of the control devices within the first step have completed updating;
      after all of the control devices within the first step have been updated and reset, concurrently update control devices within a second step; and
      concurrently reset the control devices within the second step after all of the control devices within the second step have completed updating.

2. The industrial controller of claim 1, wherein the update controller is further configured to:
   after all of the control devices within the second step have been updated and reset, concurrently update control devices within a third step; and
   concurrently reset the control devices within the third step after all of the control devices within the third step have completed updating.

3. The industrial controller of claim 1, wherein updating the control devices comprises:
   identifying an update to apply to a control device within an update library; and
   transferring the update to the control device for storage within a memory in the control device.

4. The industrial controller of claim 3, wherein the memory in the control device is a flash memory.

5. The industrial controller of claim 1, wherein the update controller is further configured to concurrently update control devices that are configured in a star topology along with the control devices that are configured in a linear topology and are within a same step.

6. The industrial controller of claim 1, wherein the update controller is further configured to:
   for each step, wait until all resets within a current step are complete, before updating any control devices within a next step.

7. The industrial controller of claim 1, wherein the update controller is further configured to display a notice when a control device has finished updating, but is waiting for other control devices within a current step to finish updating before resetting.

8. A method for updating a plurality of control devices within an industrial automation environment, the method comprising:
   identifying, by an update controller, sequential steps in an update process for each control device of the plurality of control devices that is configured in a linear topology and requires a reset after updating wherein control devices within each step are updated and reset before control devices within subsequent steps are updated;
   concurrently updating control devices within a first step;
   concurrently resetting the control devices within the first step after all of the control devices within the first step have completed updating;

after all of the control devices within the first step have been updated and reset, concurrently updating control devices within a second step; and concurrently resetting the control devices within the second step after all of the control devices within the second step have completed updating.

9. The method of claim 8, further comprising:

after all of the control devices within the second step have been updated and reset, concurrently updating control devices within a third step; and concurrently resetting the control devices within the third step after all of the control devices within the third step have completed updating.

10. The method of claim 8, wherein updating the control devices comprises:

identifying, by the update controller, an update to apply to a control device within an update library; and transferring, by the update controller, the update to the control device for storage within a memory in the control device.

11. The method of claim 10, wherein the memory in the control device is a flash memory.

12. The method of claim 8, further comprising:

concurrently updating control devices that are configured in a star topology along with the control devices that are configured in a linear topology and are within a same step.

13. The method of claim 8, further comprising:

for each step, waiting until all resets within a current step are complete, before updating any control devices within a next step.

14. The method of claim 8, further comprising:

displaying a notice when a control device has finished updating, but is waiting for other control devices within a current step to finish updating before resetting.

15. One or more non-transitory computer-readable media having stored thereon program instructions to update a plurality of control devices within an industrial automation environment, wherein the program instructions, when executed by a computing system, direct the computing system to at least:

identify sequential steps in an update process for each control device of the plurality of control devices that is configured in a linear topology and requires a reset after updating, wherein control devices within each step are updated and reset before control devices within subsequent steps are updated;

concurrently update control devices within a first step;

concurrently reset the control devices within the first step after all of the control devices within the first step have completed updating;

after all of the control devices within the first step have been updated and reset, concurrently update control devices within a second step; and concurrently reset the control devices within the second step after all of the control devices within the second step have completed updating.

16. The one or more non-transitory computer-readable media of claim 15, further comprising program instructions, which when executed by the computing system, direct the computing system to at least:

after all of the control devices within the second step have been updated and reset, concurrently update control devices within a third step; and concurrently reset the control devices within the third step after all of the control devices within the third step have completed updating.

17. The one or more non-transitory computer-readable media of claim 16, further comprising program instructions, which when executed by the computing system, direct the computing system to at least, when updating the control devices:

identify an update to apply to a control device within an update library; and transfer the update to the control device for storage within a memory in the control device.

18. The one or more non-transitory computer-readable media of claim 17, wherein the memory in the control device is a flash memory.

19. The one or more non-transitory computer-readable media of claim 15, further comprising program instructions, which when executed by the computing system, direct the computing system to at least:

concurrently update control devices that are configured in a star topology along with the control devices that are configured in a linear topology and are within a same step.

20. The one or more non-transitory computer-readable media of claim 15, further comprising program instructions, which when executed by the computing system, direct the computing system to at least:

for each step, wait until all resets within a current step are complete, before updating any control devices within a next step.

* * * * *